Oct. 31, 1944.  M. CAWEIN  2,361,745
POWER SUPPLY CIRCUIT
Filed July 24, 1941
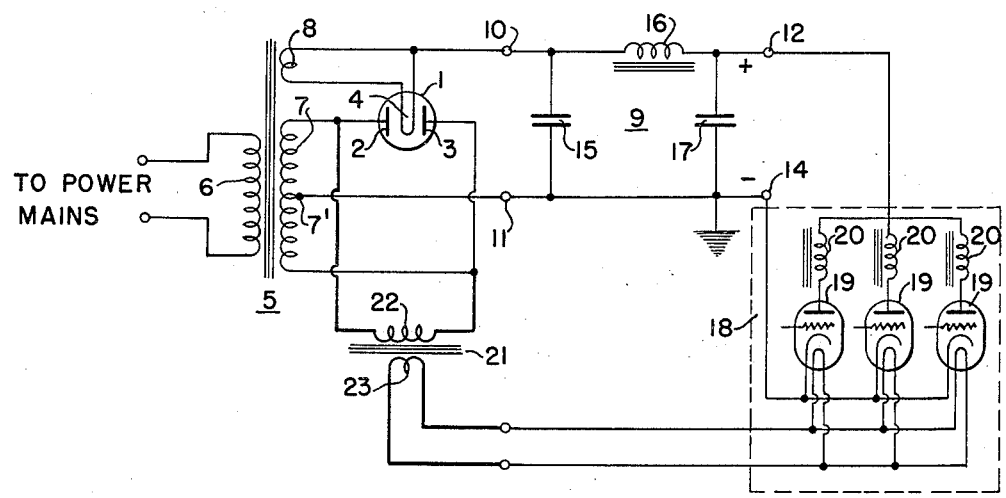
INVENTOR
MADISON CAWEIN
BY
ATTORNEY Patented Oct. 31, 1944

2,361,745

UNITED STATES PATENT OFFICE 2,361,745

POWER SUPPLY CIRCUIT

Madison Cawein, Marion, Ind., assignor to Farnsworth Television and Radio Corporation, a corporation of Delaware Application July 24, 1941, Serial No. 403,888

5 Claims. (Cl. 315—105)

This invention relates to electrical apparatus including a direct-current power supply unit and particularly relates to an arrangement for limiting voltage surges in such power supply units.

In electrical apparatus of various types, unidirectional steady operating voltages and currents are required which are generally produced by a power supply unit included in the apparatus. Such a unit usually comprises a transformer whose primary winding is connected to a source of alternating voltage, such as an available power line carrying 60-cycle alternating current, while its secondary winding is coupled to a rectifier, preferably of the vacuum type, for rectification of the alternating voltage stepped up in magnitude in accordance with the transformer ratio. The rectifier is coupled with a filter circuit for eliminating the residual fluctuating component from the developed unidirectional voltage, thereby to develop a unidirectional voltage of substantially steady magnitude.

For certain uses of the power supply units, such as in radio sound broadcasting receivers, the filter comprises an input shunt condenser, a series inductance element and a second output shunt condenser, and such a filter is commonly referred to in the art as a condenser input filter. Across the output terminals of the filter there is then developed a relatively high unidirectional voltage of substantially steady magnitude which can be employed as the anode operating voltage for electron discharge tubes, such as amplifier tubes and the like, in the electrical apparatus. Generally, the power supply transformer is provided with a second secondary winding having a few turns only for supplying heater current to the discharge tubes of the apparatus.

In the beginning of the operation of the apparatus, starting from cold condition, the discharge tubes do not immediately draw current, since a finite time is required to elevate the temperature of the cathodes thereof to the point of electron emission, particularly if tubes with indirectly heated cathodes are employed. The effect thereof is that these tubes, when cold, present substantially no load to the rectifier output and particularly the filter output. Consequently, the input condenser charges to a voltage which is in excess of the voltage developed there-across during normal operation. Since the input condenser is, in most cases, of the electrolytic type and is operated close to its maximum permissible voltage, the voltage developed thereat under conditions of no load exceeds the permissible value and destroys the condenser, since electrolytic condensers usually cannot withstand any appreciable voltage overload.

The object of the present invention, therefore, is to provide an improved arrangement in electrical apparatus including a power supply, in which voltage surges occurring at the beginning of the operation of the arrangement are limited, thereby to prevent the destruction of the filter input condenser.

In accordance with the present invention, there is provided in electrical apparatus the combination of an input transformer having a primary winding connected to a source of alternating current and a secondary winding connected to a rectifier tube. A condenser input filter is connected with its input terminals to the rectifier tube, while its output terminals are connected to a load impedance having the characteristic of decreasing its value of impedance from a substantially infinite value to a finite value during a finite interval of time immediately subsequent to the beginning of operations of the rectifier arrangement. A second load impedance is coupled to the secondary winding having the characteristic of increasing its value of impedance from an extremely small value to a larger predetermined value during the above-mentioned finite interval of time, thereby to place a compensating load upon the transformer at the beginning of the rectifier arrangement.

For a better understanding of the invention, together with other and further objects thereof, reference is had to the following description, taken in connection with the accompanying drawing, and its scope will be pointed out in the appended claims.

In the accompanying drawing, the single figure shows a schematic diagram of a rectifier arrangement and the load circuit embodying the present invention. The rectifier arrangement shown comprises a full wave high vacuum rectifier tube 1 having two anodes 2 and 3 and a directly heated cathode 4. For the purpose of applying an alternating voltage to the rectifier tube 1, there is provided a transformer 5 having a primary winding 6 connected to a power main, as indicated, and a secondary winding 7 having its respective ends connected to the anodes 2 and 3 of the rectifier tube 1. Preferably, the secondary winding 7 has a greater number of turns than the primary winding 6 so as to apply an increased alternating voltage to the rectifier tube. For heating the cathode 4 of the rectifier tube, there is provided a second secondary winding 8 on the transformer 5 having fewer turns, as determined by the required filament voltage.

For the purpose of smoothing the rectifier voltage, there is provided a filter, generally indicated at 9, for input terminals 10 and 11 and terminals 12 and 14, respectively. Connected to the input terminals 10 and 11 of the filter 9 is the cathode 4 of the rectifier tube and the center tap 7' on the secondary transformer winding 7. The filter 9 is a conventional condenser input filter comprising an input shunt condenser 15, series inductance element 16 and an output shunt condenser 17.

The electron discharge tubes of the electrical apparatus to be supplied with operating voltage are generally indicated at 18 and may comprise a plurality of electron discharge tubes 19, whose anodes are connected by way of chokes 20 to the filter output terminals 12, as is conventional in so-called shunt feed. The cathodes of the tubes 19 are all connected to the output terminal 14 of the filter 9, which is also connected to ground, as shown. In the apparatus shown at 18, all parts not essential to the present invention have been omitted, particularly the operating circuit connections of the tubes 19, since these tubes may be used as oscillation amplifiers, modulators, detectors or the like, without changing the spirit of this invention.

In accordance with the present invention, filament current is supplied to the filaments on tubes 19 by means of a second transformer 21 having a primary winding 22 connected to the ends of the secondary winding 7 of the transformer 5 and having a secondary winding 23 connected to the filaments on tubes 19. Preferably, the transformer 21 is a stepdown transformer for providing the proper filament voltage to the filaments on tubes 19. The filaments on tubes 19 have the characteristic of having a low impedance when cold and an appreciable impedance when hot, which characteristic is utilized, as explained below, in connection with the operation of the system.

In considering the operation of the apparatus shown in the single figure of the drawing, it may first be assumed that the apparatus is in cold condition, that is, the cathodes of the rectifier tube 1 and the tubes 19 are cold. In this condition, the tubes 19 represent a substantially infinite impedance or no load between the terminals 12 and 14 of the filter 9. When the apparatus is set in operation, for example, by connecting the primary winding 6 of the transformer 5 to the power mains, the cathode 4 of the rectifier tube 1 becomes heated fairly rapidly to the point of electron emission and current flows in the rectifier tube 1. Since the cathodes of the tubes 19 are indirectly heated, these tubes require a longer time until they draw current, and, therefore, the load represented by these tubes, requires a longer time to acquire its predetermined value. Therefore, at the very beginning of the operation, the tubes 19 present an infinite impedance across the filter output terminals 12 and 14 which gradually decreases to its normal operating value. At the beginning of the operation, therefore, the filter 9 is unloaded and the condenser 15 would tend to accumulate a charge producing voltage thereacross in excess of its normal, permissible operating value. This, however, is prevented, in accordance with the present invention, due to the load across the secondary winding 7 of the transformer 5 represented by the filaments of tubes 19 coupled thereto by way of the transformer 21. In cold condition, the resistance of the filaments of tubes 19 is relatively low and increases gradually with increasing filament temperature. Hence, in the very beginning of the operation, the cold filaments place a heavy load across the transformer secondary winding 7 and thereby reduce the voltage developed thereacross. Obviously, the rectifier voltage is then less than its normal operating value, instead of in excess thereof, as would be the case in conventional arrangements. After the cathodes of tubes 19 have reached their normal operating temperature and the tubes 19 show normal operating condition, the load across the filter output terminals 12 and 14 assumes its normal operating value, and the load presented by the filament of tubes 19 across the secondary winding 7 of the transformer 5 becomes sufficiently small so as not to impede the generation of the required high unidirectional voltage across the filter output terminals 12 and 14.

While the invention has been described in connection with a high-vacuum rectifier tube, it is to be understood that it is not limited thereto and any other rectifier is deemed a full equivalent thereof.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In electrical apparatus the combination of an input transformer having a primary winding and a secondary winding, means for connecting said primary winding to a source of alternating current, a rectifier, a filter having a pair of input and a pair of output terminals and including an input condenser, means for connecting said secondary winding and said rectifier in series relation between said input terminals, a load impedance connected to said output terminals, said impedance having the characteristic of decreasing its value of impedance from a substantially infinite value to a finite value during a finite interval of time immediately subsequent to the beginning of operation of said rectifier arrangement, and a second load impedance coupled to said secondary winding, said last-named impedance having the characteristic of increasing its value of impedance from an extremely small value to a larger predetermined value during said finite interval of time, thereby to place a compensating load upon said transformer at the beginning of the operation of said rectifier arrangement.

2. In electrical apparatus the combination of an input transformer having a primary winding and a secondary winding, means for connecting said primary winding to a source of alternating current, a rectifier, a filter having a pair of input and a pair of output terminals and including an input condenser, means for connecting said secondary winding and said rectifier in series relation across said input terminals, an electron discharge tube having at least an anode, a cathode, and a heater filament, means for connecting said anode and said cathode to said output terminals, and means for coupling said filament to said secondary winding of said transformer to provide a load thereon.

3. In electrical apparatus the combination of an input transformer having a primary winding and a secondary winding, means for connecting said primary winding to a source of alternating current, a rectifier, a filter having input and output terminals and including an input condenser, means for connecting said secondary winding and said rectifier in series relation across said input terminals, an electron discharge tube having at least an anode, a cathode, and a heater filament, means for connecting said anode and said cathode to said output terminals, a second transformer having a primary winding and a secondary winding, means for connecting said last-named primary winding in parallel relation to said first-named secondary winding, and means for connecting said secondary winding of said second transformer to said filament for supplying current thereto.

4. In electrical apparatus the combination of an input transformer having a primary winding and a secondary winding, means for connecting said primary winding to a source of alternating current, a rectifier, a filter having a pair of input and a pair of output terminals and including an input condenser, means for connecting said secondary winding and said rectifier in series relation across said input terminals, an electron discharge tube having at least an anode and a cathode, means for connecting said anode and said cathode to said output terminals, and means for coupling said cathode to said secondary winding of said transformer to provide a load thereon to derive heating power from said secondary winding.

5. In combination, a source of alternating current, a transformer connected thereto and comprising a primary winding connected to said source, a secondary winding, a rectifier connected across said secondary winding, a filter comprising an input condenser connected to said secondary winding and said rectifier, an electron tube comprising at least an anode, a cathode and a heater filament, said anode and cathode being connected across said filter, and means comprising said heater filament for providing a load on said secondary winding.

MADISON CAWEIN.